United States Patent
Sarangapurkar et al.

(10) Patent No.: US 11,030,652 B2
(45) Date of Patent: Jun. 8, 2021

(54) SYSTEMS AND METHODS FOR FACET DISCOVERY

(71) Applicant: Walmart Apollo, LLC, Bentonville, AR (US)

(72) Inventors: Raghavendra Sarangapurkar, Fremont, CA (US); Phanindra Vuppalapati, San Jose, CA (US); Michael Jayson C. De Leon, Dublin, CA (US); Diego Alvaro Goyret, Los Gatos, CA (US); Siddarth Vasant Gaonkar, Union City, CA (US); Zuzar F. Nafar, Mountain View, CA (US); Rohit Deep, Union City, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 89 days.

(21) Appl. No.: 16/254,506

(22) Filed: Jan. 22, 2019

(65) Prior Publication Data

US 2020/0234334 A1    Jul. 23, 2020

(51) Int. Cl.
*G06Q 30/00* (2012.01)
*G06Q 30/02* (2012.01)
*G06F 16/953* (2019.01)

(52) U.S. Cl.
CPC ....... *G06Q 30/0256* (2013.01); *G06F 16/953* (2019.01); *G06Q 30/0276* (2013.01)

(58) Field of Classification Search
None
See application file for complete search history.

(56) References Cited

U.S. PATENT DOCUMENTS

| | | | |
|---|---|---|---|
| 9,594,540 B1* | 3/2017 | Stasior | G06F 7/00 |
| 9,959,563 B1* | 5/2018 | Wu | G06Q 30/0631 |
| 10,032,205 B2* | 7/2018 | Pathak | G06F 16/24573 |
| 10,127,603 B2* | 11/2018 | Garera | G06Q 30/0283 |
| 10,210,557 B2* | 2/2019 | Abhishek | G06F 16/248 |
| 10,262,068 B2* | 4/2019 | Gungor | G06F 16/9535 |

(Continued)

OTHER PUBLICATIONS

STIC EIC 3600 Search Report for U.S. Appl. No. 16/254,506 dated Jul. 22, 2020. (Year: 2020).*

(Continued)

*Primary Examiner* — Matthew T Sittner
(74) *Attorney, Agent, or Firm* — Duane Morris LLP; Manita Rawat

(57) ABSTRACT

This application relates generally to systems and methods for identification of facets for associated items in a datastore. In an embodiment, a method performed by a computing device includes: receiving, from a supplier device, a first item dataset characterizing a first item purchasable on a sales platform. The method also includes associating the first item with a facet in accordance with an instruction from an internal merchant device, where the facet is separate from the first item dataset, and where the facet may be selected to differentiate the first item from a second item purchasable on the sales platform. The method also includes retrieving the facet from a datastore in response to an item request from a customer device. The method also includes retrieving the first item dataset from a datastore in response to a selection of the facet from the customer device.

20 Claims, 9 Drawing Sheets

(56) References Cited

U.S. PATENT DOCUMENTS

| | | | | |
|---|---|---|---|---|
| 10,366,432 B2* | 7/2019 | Sondhi | | G06Q 30/0629 |
| 10,452,705 B2* | 10/2019 | Yu | | G06F 16/438 |
| 10,515,402 B2* | 12/2019 | Chen | | G06F 16/285 |
| 10,614,498 B2* | 4/2020 | Shrivastava | | G06Q 30/0623 |
| 2002/0087579 A1* | 7/2002 | Chasanoff | | G06F 16/288 |
| 2007/0219816 A1* | 9/2007 | Van Luchene | | G06Q 10/06 |
| | | | | 705/80 |
| 2008/0086451 A1* | 4/2008 | Torres | | G06F 16/951 |
| 2008/0091549 A1* | 4/2008 | Chang | | G06Q 30/0269 |
| | | | | 705/14.66 |
| 2010/0169361 A1* | 7/2010 | Chen | | G06F 16/36 |
| | | | | 707/769 |
| 2010/0268600 A1* | 10/2010 | Banko | | G06Q 30/0254 |
| | | | | 705/14.52 |
| 2013/0091162 A1* | 4/2013 | Lewak | | G06F 16/2423 |
| | | | | 707/769 |
| 2014/0164387 A1* | 6/2014 | Chen | | G06F 16/36 |
| | | | | 707/740 |
| 2014/0358900 A1* | 12/2014 | Payne | | G06F 16/48 |
| | | | | 707/722 |
| 2015/0019567 A1* | 1/2015 | Li | | G06F 3/0482 |
| | | | | 707/748 |
| 2015/0220940 A1* | 8/2015 | Tuteja | | G06Q 30/0201 |
| | | | | 705/7.29 |
| 2016/0140789 A1* | 5/2016 | Wickersham, III | | |
| | | | | H04L 12/1827 |
| | | | | 705/12 |
| 2016/0154856 A1* | 6/2016 | Olof-Ors | | G06F 16/24578 |
| | | | | 707/728 |
| 2016/0284001 A1* | 9/2016 | Pathak | | G06Q 30/0627 |
| 2017/0061015 A1* | 3/2017 | Gungor | | G06F 16/2425 |
| 2017/0116341 A1* | 4/2017 | Wenger | | G06F 16/9535 |
| 2017/0124619 A1* | 5/2017 | Abhishek | | G06F 17/148 |
| 2017/0148078 A1* | 5/2017 | Agarwal | | G06F 16/285 |
| 2017/0154113 A1* | 6/2017 | Yu | | G06F 11/3672 |
| 2017/0300946 A1* | 10/2017 | Wilkinson | | G06Q 30/0204 |
| 2017/0372372 A1* | 12/2017 | Zedell | | H04M 1/72522 |
| 2018/0075493 A1* | 3/2018 | Agarwal | | G06Q 30/0261 |
| 2018/0096335 A1* | 4/2018 | Moghaizel | | G06Q 20/227 |
| 2018/0165297 A1* | 6/2018 | Kuchoor | | G06F 16/1873 |
| 2019/0130496 A1* | 5/2019 | Aroli Veettil | | G06Q 20/401 |

OTHER PUBLICATIONS

STIC EIC 3600 Search Report for U.S. Appl. No. 16/254,506 dated Oct. 7, 2020. (Year: 2020).*

* cited by examiner

SYSTEMS AND METHODS FOR FACET DISCOVERY

TECHNICAL FIELD

This application relates generally to automated systems and methods for identification of facets for associated items in a datastore.

BACKGROUND

A supplier may provide a product or service for sale or promotion on an virtual advertising platform. For simplicity of explanation, reference to an item may refer broadly to either a product or a service that may be purchased (e.g., that is for sale or purchasable). These items may be respectively characterized and expressed as item datasets of item data. For example, Each item dataset may include an identifier for the associated item as well as specifications for the item, such as a brand, origin, price, size, color, or any other descriptor of the associated item. This item dataset may then be utilized by a customer to identify a desired item for purchase. However, as the volume and variety of items increases on the virtual advertising platform, the use of supplier provided item data (e.g., item datasets that characterize respective items) to search for the items may become more cumbersome. For example, different suppliers may characterize similar items differently and certain supplier provided item datasets may not be relevant for a customer to identify an item for purchase. Therefore, traditional techniques of identifying items for sale on an virtual advertising platform may not be entirely satisfactory.

The foregoing examples of the related art and limitations related therewith are intended to be illustrative and not exclusive. Other limitations of the related art will become apparent upon a reading of the specification and a study of the drawings.

SUMMARY

The exemplary embodiments disclosed herein are directed to solving the issues relating to one or more of the problems presented in the prior art, as well as providing additional features that will become readily apparent by reference to the following detailed description when taken in conjunction with the accompanied drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In an embodiment, a system includes at least one processor operatively coupled with a datastore, the at least one processor configured to receive, from a supplier device, a first item dataset characterizing a first item purchasable on a sales platform. The at least one processor is also configured to associate the first item with a facet in accordance with an instruction from an internal merchant device, where the facet is separate from the first item dataset, and where the facet may be selected to differentiate the first item from a second item purchasable on the sales platform. The at least one processor is also configured to retrieve, from the datastore, the facet in response to an item request from a customer device. The at least one processor is also configured to retrieve, from the datastore, the first item dataset in response to a selection of the facet from the customer device.

In an embodiment, a method performed by a computing device includes: receiving, from a supplier device, a first item dataset characterizing a first item purchasable on a sales platform. The method also includes associating the first item with a facet in accordance with an instruction from an internal merchant device, where the facet is separate from the first item dataset, and where the facet may be selected to differentiate the first item from a second item purchasable on the sales platform. The method also includes retrieving the facet from a datastore in response to an item request from a customer device. The method also includes retrieving the first item dataset from a datastore in response to a selection of the facet from the customer device.

An embodiment includes a non-transitory computer readable medium having instructions stored thereon. The instructions, when executed by a processor, cause a device to perform operations including receiving, from a supplier device, a first item dataset characterizing a first item purchasable on a sales platform. The operations also include associating the first item with a facet in accordance with an instruction from an internal merchant device, where the facet is separate from the first item dataset, and where the facet may be selected to differentiate the first item from a second item purchasable on the sales platform. The operations also include retrieving the facet from a datastore in response to an item request from a customer device. The operations also include retrieving the first item dataset from the datastore in response to a selection of the facet from the customer device.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Figure 1:
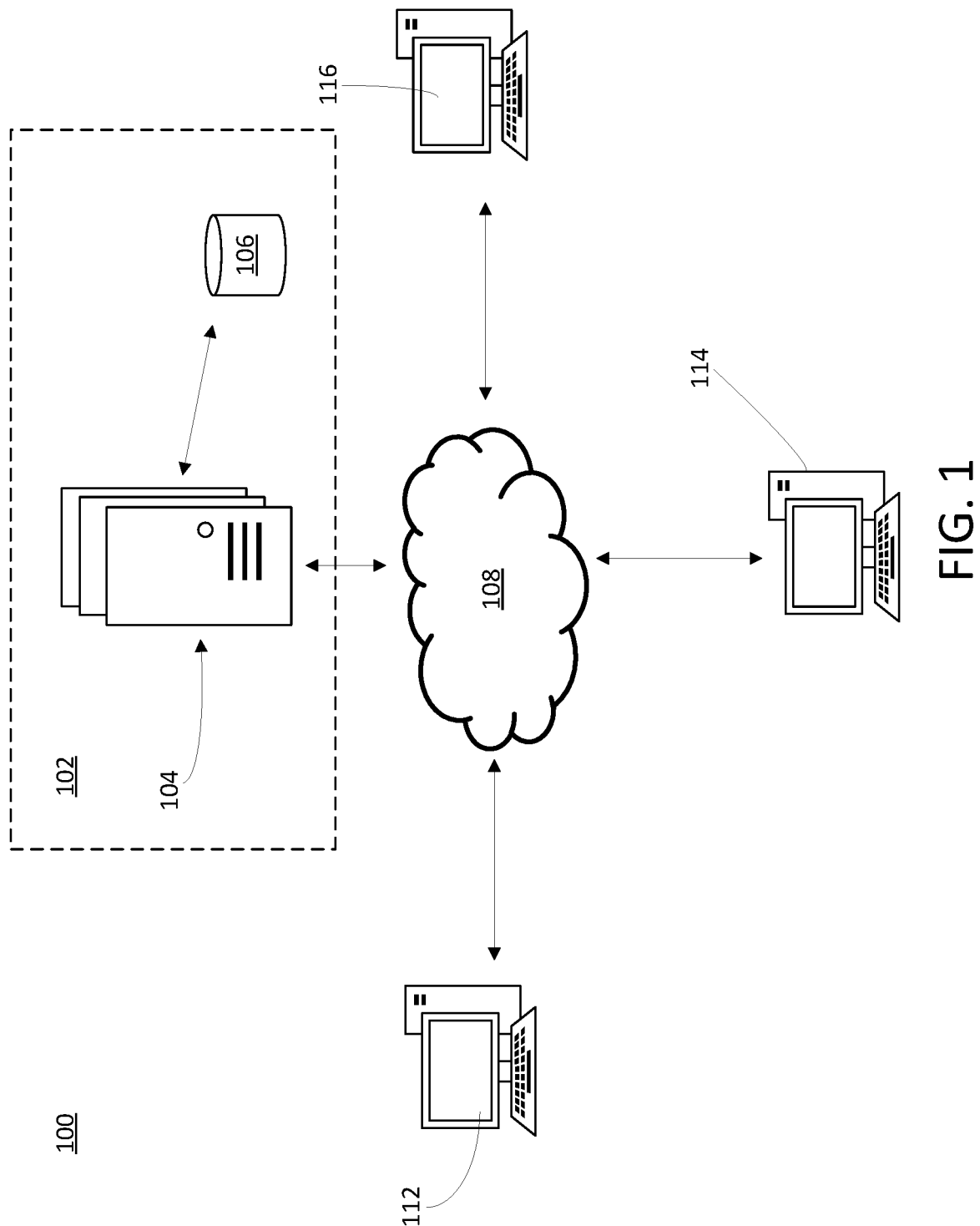
FIG. 1 is a system diagram illustrating features of a facet discovery platform, in accordance with certain embodiments.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be rearranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

A new approach is proposed that contemplates systems and methods for a facet discovery platform. This facet discovery platform may operate as a virtual advertising platform for items. A facet may be descriptors or variations on an item that may be used to differentiate one item from another. Facets may be defined and/or provided to the facet discovery platform by an internal merchant device. This internal merchant device may be different than a supplier device that provides, to the facet discovery platform, item data as item datasets characterizing respective items that may be sold or promoted via the facet discovery platform. As noted above, an item dataset may include, for example, an identifier for the item as well as specifications for the item, such as a brand, origin, price, size, or any other descriptor of the item. However, item datasets may not be necessarily useful for the selection or differentiation of items. Also, item datasets are typically limited by the detail and consistency of description provided by the supplier device that represents a supplier of items for the facet discovery platform. For example, item data that describes a supplier's internal identification number may be irrelevant, or less relevant to an end customer interested in purchasing the item to fit particular physical dimensions. As another example, item data across items, such as for shoes, may be different across different suppliers (e.g., where shoe sizes may be expressed differently in different countries of manufacture). Accordingly, the facet discovery platform may separate the treatment of item data from their associated facets so that facets may be associated, managed, and disassociated separately from the item data provided by the supplier device. Furthermore, such associated facets may be new facets in that the associated facets, provided by the internal merchant device, are not part of the item data or item datasets provided by a supplier device. In this manner, the association of facets to item data may be managed more effectively for item identification by customers (e.g., customers using a customer device) without interference with the ingestion of item data from suppliers (e.g., suppliers using a supplier device) to the virtual advertising platform.

An internal merchant, via an internal merchant device, may define associated facets for items. The internal merchant may be an operator or technician associated with the virtual advertising platform separate from the customer, represented by the customer device, or the supplier, represented by the supplier device. The internal merchant device may review the items from item datasets provided by the supplier device to determine associated facets to describe respective items for customers. In certain embodiments, the internal merchant may provide association instructions that define a particular facet as an associated facet for an item when certain item data in an item dataset characterizes the particular item. For example, the association instructions may copy and/or convert information characterizing a size of an item as provided in an item dataset into an associated facet for the item. In further embodiments, the internal merchant may provide association instructions that includes an association threshold value for when a keyword descriptor used in a search string provided by a customer is to be added to associated facets for an item. In additional embodiments, the internal merchant may provide association instructions that include a disassociation threshold value for when a selected facet is to be disassociated from associated facets for an item based on selection instances by a customer. Additionally, the internal merchant may provide association instructions that define the presentation of facets in a user interface for the customer, such as by presenting the associated facets in a hierarchical data structure where a selection of one facet may present other more specific facets for selection so as to not clutter presentation of facets in a user interface.

FIG. 1 is a system diagram 100 illustrating features of a facet discovery platform 102, in accordance with certain embodiments. The facet discovery platform 102 (illustrated within dotted ones) may include a facet discovery server 104 (implemented as one or more servers), and a datastore 106. In certain embodiments, each of the functionality of the facet discovery server 104, and datastore 106 may be implemented in a single remote server and/or locally on a user device. Each of the facet discovery server 104 and the datastore 106 may be communicatively coupled with each other directly. Also, the facet discovery platform 102, in whole or in part, may be communicatively coupled over a network 108, such as the Internet, to a variety of user devices. These user devices may include, for example, a supplier device 112, an internal merchant device 114, and a customer device 116.

As noted above, a supplier may interface with the facet discovery platform 102 via the supplier device 112, an internal merchant may interface with the facet discovery platform 102 via the internal merchant device 114, and a customer may interface with the facet discovery platform 102 via the customer device 116. Accordingly, in the context of the facet discovery platform 102, reference to a supplier may also refer to the supplier device 112, reference to an internal merchant may also refer to the internal merchant device 114, and reference to a customer may also refer to the customer device 116. Furthermore, each of the supplier device 112, internal merchant device 114, and customer device 116 may refer to one or more devices of a same or different type. In certain embodiments, each of the supplier device 112, internal merchant device 114, and customer device 116 may be implemented as different software applications or user accounts that may run within a same physical device (e.g., within a same physical housing). Also, each of the supplier device 112, internal merchant device 114, customer device 116, and facet discovery server 104 may be interconnected over the network 108.

The supplier device 112 may provide item data for a number of items to the facet discovery server 104, as part of the facet discovery platform 102, over the network 108. The item data may include a number of item datasets that each characterize a respective item that may be sold or promoted via the facet discovery platform 102 functioning as a virtual advertising platform for the items. Each item dataset may include, for example, an item identifier that uniquely identifies an item, along with other information that characterizes the item. The facet discovery server 104 may then store the item data within the datastore 106, accessible to the facet discovery server 104.

The internal merchant device 114 may then access the item data, stored in the datastore 106, to associate facets with respective items within the datastore. In certain embodiments, as noted above, the internal merchant device 114 may provide association instructions to the facet discovery server. These association instructions may define a particular facet as an associated facet when certain item data from an item dataset characterizes a particular item. For example, the association instructions may associate facets that are expressed in a size classification system (e.g., small, medium, large, or extra-large) based on whether the item dataset for the item includes size information that may be used to infer a size within the size classification system (e.g., whether the item dataset characterizes the item as having one or more sizes within the size classification system). Also, the association instructions may associate a facet with an item as converted from item data that includes a different expression of size (e.g., expression of size as a numerical value rather than the classes of small, medium, large, or extra-large) to a size within the size classification system. As another example, the association instructions may convert between different standards of measurement to arrive at an associated facet, such as association instructions that associate a facet for an item expressed in the metric system based on item data for the item within an item dataset expressed in the imperial system. As yet a further example, the internal merchant may define certain standard terms for facets such that variations of item data for different items may be expressed with a same facet, such as when 30 mm and 30 millimeters in item data describing a diameter may be expressed as 30 mm in an associated facet.

In further embodiments, the internal merchant device 114 may provide an association threshold value for when a keyword descriptor used in a search string provided by a customer device 116 is to be added to associated facets for an item. In additional embodiments, the internal merchant device 114 may provide a disassociation threshold value for when a selected facet is to be disassociated from associated facets for an item based on selection instances by customer devices 116. Additionally, the internal merchant may define the presentation of facets in a user interface for the customer, such as by presenting the associated facets in a hierarchical data structure where a selection of one facet may present other more specific facets for selection so as to not clutter presentation of facets in a user interface of a customer device 116.

The associated facets may then be utilized by the customer device 116 to browse and/or search for items within the datastore 106. For example, the customer device 116 may provide credentials, such as a customer identifier (e.g., login credentials), to the facet discovery server 104 for access to the items stored within the datastore 106. Once authorized by the facet discovery server 104, the customer device 116 may then retrieve the respective items (e.g., as item datasets of item data characterizing the item) from the datastore 106.

In the course of finding the desired items for retrieval from the datastore 106, the customer device 116 may traverse the various facets associated with the items within the datastore 106 in order to arrive more effectively at the desired items. For example, the customer device may enter search criteria (e.g., a search string, keyword, and/or search parameter) to the facet discovery server 104 so that the facet discovery server 104 may retrieve search results of items from the datastore 106 for presentation at the customer device 116. Along with the items, the associated facets for the retrieved items may also retrieved from the datastore 106 for presentation at the customer device 116. Then, the customer device may select or filter for items that meets only particular associated facets to further refine the search for items.

For example, a customer device may initiate a search for a particular item, such as a particular television. This may include providing keyword descriptors such as "40 inch television" to the facet discovery server 104 to retrieve search results. Then, the facet discovery server 104 may retrieve related items from the datastore 106 for presentation at the customer device 118. These items may be presented (e.g., as a list) for browsing at the customer device 118 for further processing, such as a purchase transaction (e.g., a purchase order). Along with the search results, the facet discovery server 104 may present the associated facets for the items. These associated facets may present variations on the items that may be utilized to differentiate between the various items in the search results. For example, these facets may include a corner to corner screen size for the various televisions, such as 40 inch, 49 inch, and 50 inch. Then, the customer device may select a particular facet (e.g., 40 inch) to filter through the presented search results for televisions to only present items with the associated facet of a 40 inch corner to corner screen size. Thus, search results from the various items at the datastore 106 may be more effectively filtered for a desired item via the customer device 118.

Figure 2:
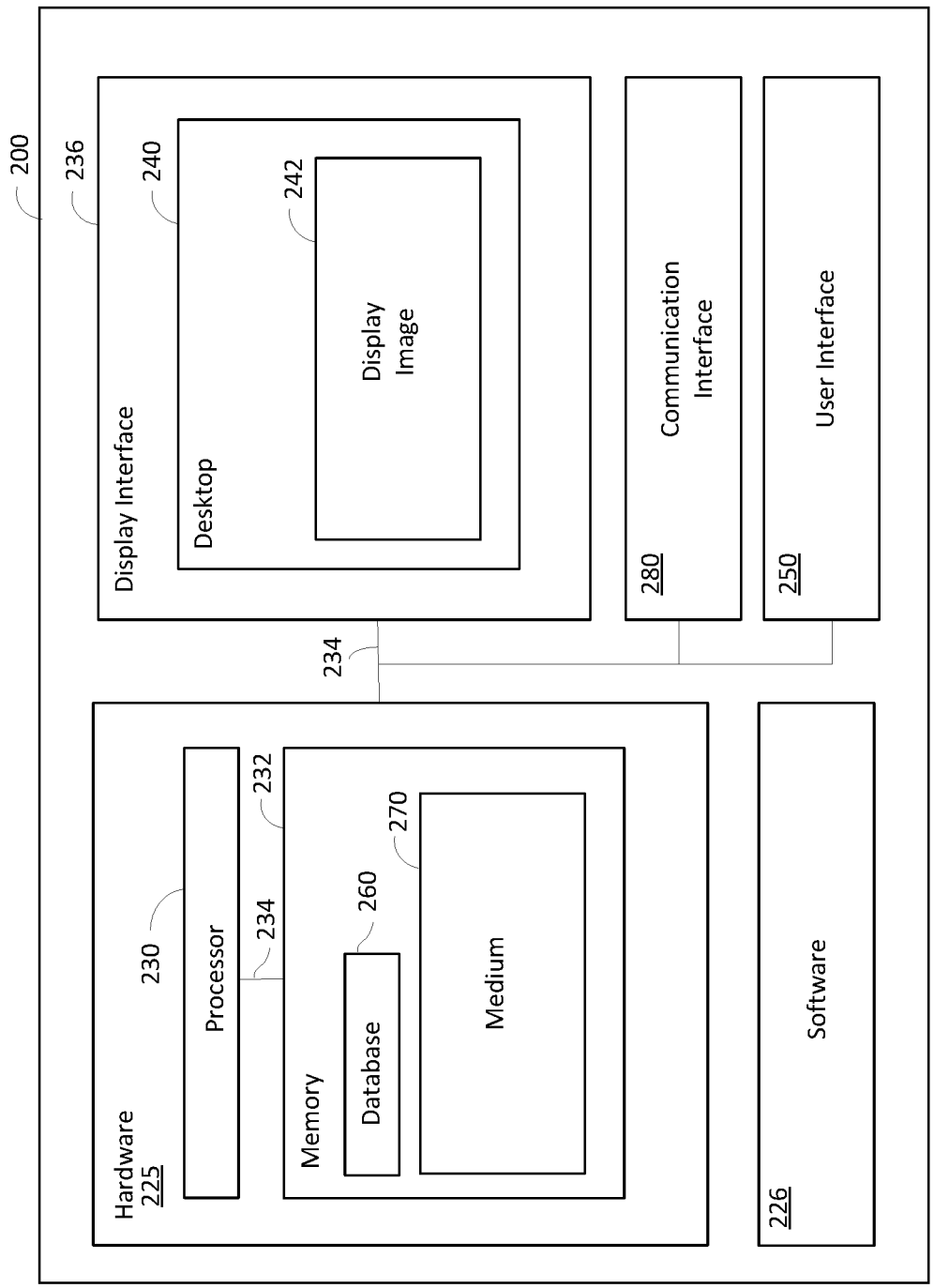
FIG. 2 is a block diagram of an exemplary computing device, in accordance with various embodiments.

FIG. 2 is a block diagram of an exemplary computing device 200, in accordance with various embodiments. As noted above, the computing device 200 may represent exemplary components of a particular user device (e.g., the supplier device, internal merchant device, customer device) or server (e.g., the facet discovery server). In some embodiments, the computing device 200 includes a hardware unit 225 and software 226. Software 226 can run on hardware unit 225 (e.g., the processing hardware unit) such that various applications or programs can be executed on hardware unit 225 by way of software 226. In some embodiments, the functions of software 226 can be implemented directly in hardware unit 225 (e.g., as a system-on-a-chip, firmware, field-programmable gate array ("FPGA"), etc.). In some embodiments, hardware unit 225 includes one or more processors, such as processor 230. In some embodiments, processor 230 is an execution unit, or "core," on a microprocessor chip. In some embodiments, processor 230 may include a processing unit, such as, without limitation, an integrated circuit ("IC"), an ASIC, a microcomputer, a programmable logic controller ("PLC"), and/or any other programmable circuit. Alternatively, processor 230 may include multiple processing units (e.g., in a multi-core configuration). The above examples are exemplary only, and, thus, are not intended to limit in any way the definition and/or meaning of the term "processor." Hardware unit 225 also includes a system memory 232 that is coupled to processor 230 via a system bus 234. Memory 232 can be a general volatile RAM. For example, hardware unit 225 can include a 32 bit microcomputer with 2 Mbit ROM and 64 Kbit RAM, and/or a number of GB of RAM. Memory 232 can also be a ROM, a network interface (NIC), and/or other device(s).

In some embodiments, the system bus 234 may couple each of the various system components together. It should be noted that, as used herein, the term "couple" is not limited to a direct mechanical, communicative, and/or an electrical connection between components, but may also include an indirect mechanical, communicative, and/or electrical connection between two or more components or a coupling that is operative through intermediate elements or spaces. The system bus 234 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, optionally, the computing device 200 can also include at least one media output component or display interface 236 for use in presenting information to a user. Display interface 236 can be any component capable of conveying information to a user and may include, without limitation, a display device (not shown) (e.g., a liquid crystal display ("LCD"), an organic light emitting diode ("OLED") display, or an audio output device (e.g., a speaker or headphones). In some embodiments, computing device 200 can output at least one desktop, such as desktop 240. Desktop 240 can be an interactive user environment provided by an operating system and/or applications running within computing device 200, and can include at least one screen or display image, such as display image 242. Desktop 240 can also accept input from a user in the form of device inputs, such as keyboard and mouse inputs. In some embodiments, desktop 240 can also accept simulated inputs, such as simulated keyboard and mouse inputs. In addition to user input and/or output, desktop 240 can send and receive device data, such as input and/or output for a FLASH memory device local to the user, or to a local printer.

In some embodiments, the computing device 200 includes an input or a user interface 250 for receiving input from a user. User interface 250 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of the media output component and the input interface. In some embodiments, mobile devices, such as tablets, can be used.

In some embodiments, the computing device 200 can include a database 260 within memory 232, such that various information can be stored within database 260. Alternatively, in some embodiments, database 260 can be included within a remote datastore (not shown) or a remote server (not shown) with file sharing capabilities, such that database 260 can be accessed by computing device 200 and/or remote end users. In some embodiments, a plurality of computer-executable instructions can be stored in memory 232, such as one or more computer-readable storage medium 270 (only one being shown in FIG. 2). Computer-readable storage medium 270 includes non-transitory media and may include volatile and nonvolatile, removable and non-removable mediums implemented in any method or technology for storage of information such as computer-readable instructions, data structures, program modules or other data. The instructions may be executed by processor 230 to perform various functions described herein.

In the example of FIG. 2, the computing device 200 can be a communication device, a storage device, or any device capable of running a software component. For non-limiting examples, the computing device 200 can be but is not limited to a server machine, smartphone, a laptop PC, a desktop PC, a tablet, a Google's Android device, an iPhone, an iPad, and a voice-controlled speaker or controller.

The computing device 200 has a communications interface 280, which enables the computing devices to communicate with each other, the user, and other devices over one or more communication networks following certain communication protocols, such as TCP/IP, http, https, ftp, and sftp protocols. Here, the communication networks can be but are not limited to, the Internet, an intranet, a wide area network (WAN), a local area network (LAN), a wireless network, Bluetooth, WiFi, and a mobile communication network.

In some embodiments, the communications interface 280 may include any suitable hardware, software, or combination of hardware and software that is capable of coupling the computing device 200 to one or more networks and/or additional devices. The communications interface 280 may be arranged to operate with any suitable technique for controlling information signals using a desired set of communications protocols, services or operating procedures. The communications interface 280 may comprise the appropriate physical connectors to connect with a corresponding communications medium, whether wired or wireless.

A network may be utilized as a vehicle of communication. In various aspects, the network may comprise local area networks (LAN) as well as wide area networks (WAN) including without limitation the Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 280 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 280 may comprise a wireless interface comprising one or more antennas, transmitters, receivers, transceivers, amplifiers, filters, control logic, and so forth.

In various aspects, the communications interface 280 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

Figure 3A:
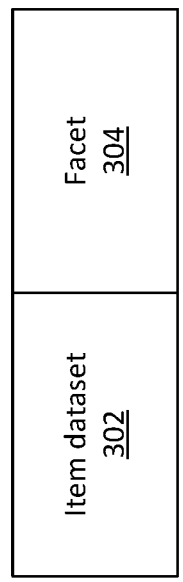
FIG. 3A illustrates a data structure relationship between an item dataset and a facet, in accordance with various embodiments.

FIG. 3A illustrates a data structure relationship between an item dataset 302 and a facet 304, in accordance with various embodiments. The single item dataset 302 may include item data that characterizes a single purchasable item. Stated another way, the single item dataset 302 may represent a single purchasable item as the item data that characterizes the single purchasable item. This item data may be provided by a supplier device. For example, the item dataset 302 may be of a particular television (e.g., item) that may be purchased over a facet discovery platform. The item dataset for the particular television may include, for example, an identifier for the particular television as well as specifications for the particular television, such as a brand, origin, price, screen size, or any other descriptor of the television. In certain embodiments, this item dataset 302 may be provided by a supplier device for sale or promotion via a facet discovery platform.

The item dataset 302 may be associated with at least one facet 304. The facet 304 may be defined by association instructions from an internal merchant device. The facet 304 may be a selectable variation of the item characterized by the item dataset 302. Stated another way, the facet 304 may be an identifier or other data separate from the item data provided by the supplier device that may be utilized (e.g., selected) to differentiate the item of the item dataset 302 from other items.

For example, the item dataset 302 may be for a specific item (e.g., a specific television), that may have an associated facet 304 (e.g., a 40 inch corner to corner screen size) that characterizes the specific item and that may be utilized to distinguish the specific item from other items (e.g., other televisions without a 40 inch corner to corner screen size). Accordingly, the facet 304 (e.g., a 40 inch corner to corner screen size) may be utilized as a selectable feature to filter for the desired specific item (e.g., the desired specific television) from other items that are not associated with the facet. Accordingly, a search result that produces a listing of resultant items (e.g., specific items identified in respective item datasets) may also come with associated facets across each of the resultant items. Then, a customer device may more easily filter, pick, and choose among the resultant items to find the desired item by selecting among the facets associated with the resultant items.

Furthermore, as illustrated, the item dataset 302 may be separate from, but associated with, the facet 304. Stated another way, the facet 304 defined by the internal merchant device may be separate from item data (e.g., item data that is part of item datasets that characterize specific items) provided by the supplier device. Accordingly, the associated facet 304 may be independently managed (e.g., updated) apart from their associated item dataset 302 (e.g., while maintaining the associated item dataset 302). Likewise, the item dataset 302 may be independently managed (e.g., updated) apart from their associated facet 304 (e.g., while maintaining the associated facet 304).

Figure 3B:
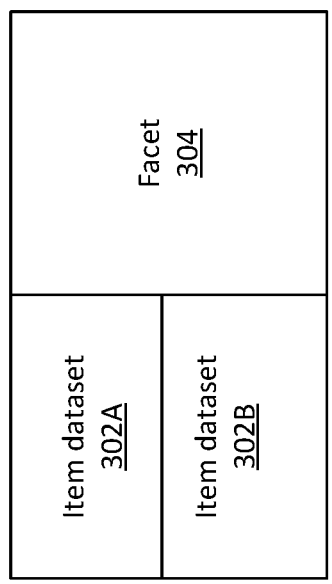
FIG. 3B illustrates a data structure relationship between multiple item datasets that share a same associated facet, in accordance with various embodiments.

FIG. 3B illustrates a data structure relationship between multiple item datasets 302A, 302B that share a same associated facet 304, in accordance with various embodiments. Stated another way, FIG. 3B illustrates a data structure relationship between a single facet 304 shared among different items (e.g., different items as characterized by different item datasets 302A, 302B). As noted above, each item dataset 302A, 302B may characterize a single distinct item. However, these different item datasets may share the same associated facet 304. For example, each of these item datasets 302A, 302B may characterize different televisions. However, each of these different televisions may be characterized by a same facet, such as a same corner to corner screen size of 40 inches. Accordingly, these different item datasets 302A 302B for different televisions (e.g., items) may share a same facet 304 (e.g., a 40 inch corner to corner screen size).

Figure 3C:
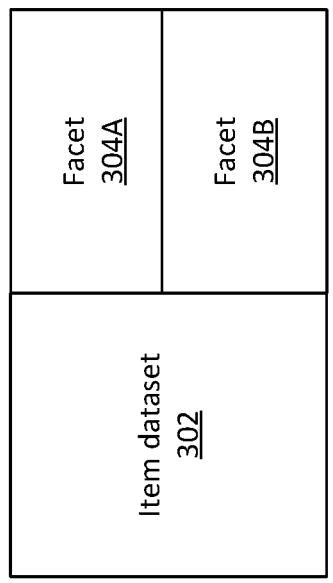
FIG. 3C illustrates a data structure relationship between a single item dataset with multiple associated facets, in accordance with various embodiments.

FIG. 3C illustrates a data structure relationship between a single item dataset 302 with multiple associated facets 304A, 304B, in accordance with various embodiments. For example, the item dataset may characterize a single item (e.g., a single specific purchasable television). However, the single item may have multiple facets as variations on the single item, such as a 40 inch corner to corner screen size and a certain brand of manufacturer. Accordingly, this single television (e.g., item) may share multiple facets 304A, 304B (e.g., a 40 inch corner to corner screen size and a certain brand of manufacturer).

Figure 4:
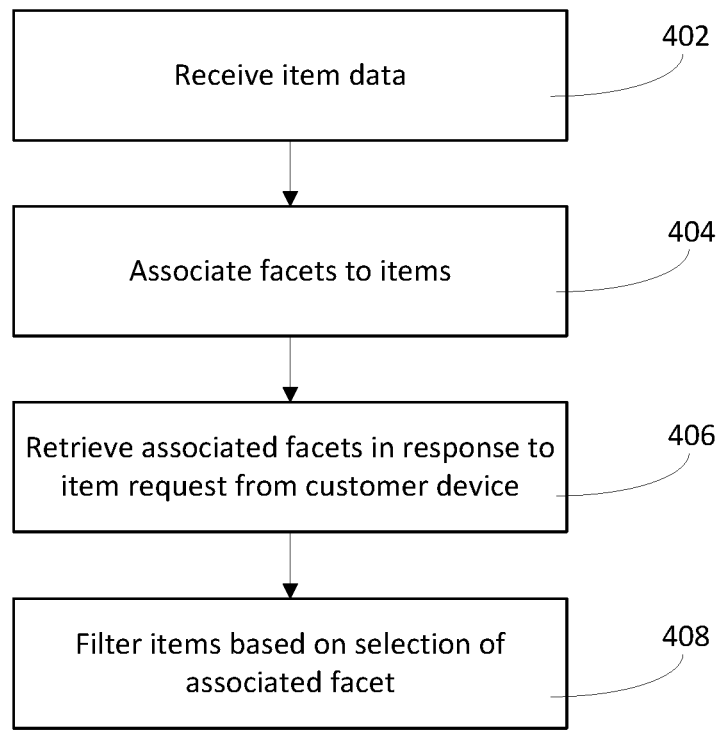
FIG. 4 is a block diagram that illustrates a facet based item discovery process, in accordance with various embodiments.

FIG. 4 is a block diagram that illustrates a facet based item discovery process 400, in accordance with various embodiments. The process 400 may be performed at a facet discovery platform in communication with a supplier device, internal merchant device, and customer device, as introduced above. The facet discovery platform may include a datastore and an facet discovery server implemented as at least one server. In certain embodiments, the facet discovery platform may be implemented as a single server or within a single housing. It is noted that the process 400 is merely an example, and is not intended to limit the present disclosure. Accordingly, it is understood that additional operations may be provided before, during, and after the process 400 of FIG. 4, certain operations may be omitted, certain operations may be performed concurrently with other operations, and that some other operations may only be briefly described herein.

At block 402, item data may be received at the facet discovery platform. More specifically, the item data may be received from a supplier device in network communication with a facet discovery server of the facet discovery platform. The item data may include various item datasets that characterize respective items promoted for sale via the facet discovery platform. Also, in certain embodiments, each of the items for sale may ultimately be purchased via the facet discovery platform. Each item dataset may include, for example, an identifier for a single item as well as specifications for the item, such as a brand, manufacturer, price, size, or any other descriptor of the item. The item data may be stored, by the facet discovery server, in a datastore accessible to the facet discovery server. Also, in the course of storage in the datastore, the item data may be indexed or otherwise organized so that the various item datasets may be found and retrieved in a search (e.g., via a search engine) for particular items.

At block 404, facets may be associated with the item datasets of the item data stored within the datastore of the facet discovery platform. These facets may be associated in accordance with association instructions received from an internal merchant device. In certain embodiments, these association instruction may explicitly define facets for each item dataset, such as by providing the facets for each item dataset on a manual basis.

In further embodiments, these association instructions may define associated facets for respective item datasets based the item data within the respective item datasets. More specifically, these association instructions may define a particular facet as an associated facet when certain item data from an item dataset characterizes a particular item. For example, the association instructions may associate facets that are expressed in a size classification system (e.g., small, medium, large, or extra-large) based on whether the item dataset for the item includes size information that may be used to infer a size within the size classification system (e.g., whether the item dataset characterizes the item as having one or more sizes within the size classification system). Also, the association instructions may associate a facet with an item as converted from item data that includes a different expression of size (e.g., expression of size as a numerical value rather than the classes of small, medium, large, or extra-large) to a size within the size classification system. As another example, the association instructions may convert between different standards of measurement to arrive at an associated facet, such as association instructions that associate a facet for an item expressed in the metric system based on item data for the item within an item dataset expressed in the imperial system. As yet a further example, the internal merchant may define certain standard terms for facets such that variations of item data for different items may be expressed with a same facet, such as when 30 mm and 30 millimeters in item data describing a diameter may be expressed as 30 mm in an associated facet.

In further embodiments, the internal merchant device may provide an association threshold value for when a keyword descriptor used in a search string provided by a customer device is to be added to associated facets for an item. In additional embodiments, the internal merchant device may provide a disassociation threshold value for when a selected facet is to be disassociated from associated facets for an item based on selection instances by customer devices. Additionally, the internal merchant may define the presentation of facets in a user interface for the customer, such as by presenting the associated facets in a hierarchical data structure where a selection of one facet may present other more specific facets for selection so as to not clutter presentation of facets in a user interface of a customer device.

At block 406, associated facets may be retrieved from the datastore in response to an item request from the customer device. This item request may be a search query or other request for a particular item or items from the customer device. This search query may identify at least one keyword descriptor from which a search and/or retrieval of at least one item and associated facets may be performed. For example, the customer device may send an item request that includes search criteria (e.g., a search string, keyword descriptor, and/or search parameter) to the facet discovery server. Along with the retrieved items (e.g., item datasets), the associated facets for the retrieved items may also retrieved from the datastore for presentation at the customer device.

The customer device may then select or filter for items that are associated with only particular associated facets to further refine the search for a desired item. For example, a customer device may initiate a search for a particular item, such as a particular television. This may include providing a keyword descriptor to the facet discovery server 104 or by selecting on an option to retrieve search results based on the keyword descriptor. Then, the facet discovery server may retrieve items (e.g., item datasets for the items) that are related to the keyword descriptor from the datastore for presentation at the customer device. Along with the search results, the facet discovery server may present associated facets for the items. These associated facets may present variations on the items that may be utilized to differentiate between the various items in the search results.

At block 408, the items from the search results may be filtered based on a selection of an associated facet. The facet selection (e.g., selection of an associated facet) may be received from the customer device. This facet selection may be of a particular facet (e.g., a 40 inch television screen size) to filter through search results of items (e.g., televisions). Then, the search results of items may be filtered (e.g., whittled down) to presently only items with the associated facet (e.g., the 40 inch television screen size).

Figure 5:
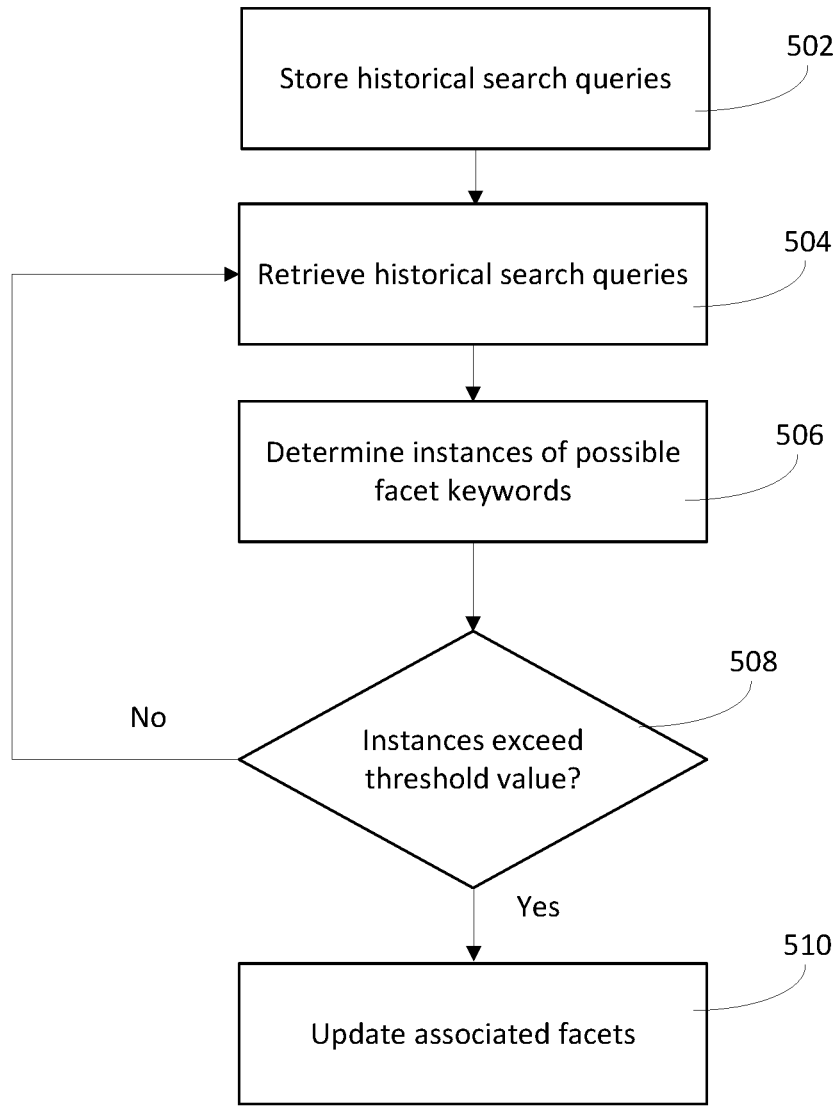
FIG. 5 is a block diagram that illustrates an additional facet discovery process, in accordance with some embodiments.

FIG. 5 is a block diagram that illustrates an additional facet discovery process 500, in accordance with some embodiments. The process 500 may be performed at a facet discovery platform in communication with a supplier device, internal merchant device, and customer device, as introduced above. The facet discovery platform may include a datastore and an facet discovery server implemented as at least one server. In certain embodiments, the facet discovery platform may be implemented as a single server or within a single housing. It is noted that the process 500 is merely an example, and is not intended to limit the present disclosure. Accordingly, it is understood that additional operations may be provided before, during, and after the process 500 of FIG. 5, certain operations may be omitted, certain operations may be performed concurrently with other operations, and that some other operations may only be briefly described herein.

At block 502, the facet discovery platform may store historical search queries for items from the datastore. These historical search queries may be search engine entries made in the past to search for particular items via the facet discovery platform. For example, these historical search queries may each include a search string of characters that form keyword descriptors of a particular item that may be input into a search engine. The keyword descriptors may be utilized by the search engine to search for an item by matching the keyword descriptors in the search string with keywords as found in an index of the item data within the datastore as associated with respective item datasets of various items. Then, based on the search results, a list of items that best matches the keyword descriptors may be retrieved from the datastore.

At block 504, the stored historical search queries may be retrieved for analysis. As noted above, these historical search queries may be an aggregation of the historical search queries stored in the datastore by the facet discovery server. In certain embodiments, all of the historical search queries may be retrieved for analysis. In other embodiments, only a certain subset of all of the historical search queries may be retrieved for analysis.

At block 506, instances of possible facet keyword descriptors may be determined from the historical search queries. Each instance may occur when a possible facet keyword descriptor is found within the historical search queries. These possible facet keyword descriptors may be keyword descriptors that may be a possible associated facet for a particular item. For example, these possible facet keyword descriptors may be defined in association instructions for particular items. These association instructions may be received from an internal merchant device and specify the possible facet keyword descriptors for a particular item. For example, the association instructions may specify a possible facet keyword descriptor as a country of manufacture (e.g., made in Japan) along with an item for a possible facet keyword descriptor. In certain embodiments, a possible facet keyword descriptor may also be associated with a specific association threshold that, when passed, determines when the possible facet keyword descriptor is to be an associated facet for the particular item.

At block 508, a decision may be made as to whether a number of instances of a possible facet keyword descriptor within the historical search queries exceeds a threshold value for a particular item. As noted above, this threshold value may be that provided by an internal merchant device as an association threshold value in association instructions. In certain embodiments, this association threshold value may be a numerical value. In other embodiments, this association threshold value may be a numerical value within a unit of time. If the new keyword descriptor instances exceed (e.g., pass) the threshold value, the process 500 may proceed to block 510. If the new keyword descriptor instances does not exceed (e.g., do not pass) the threshold value, the process may proceed back to block 504.

At block 510, the facet discovery platform may update the associated facets for the particular item with the possible facet keyword descriptor. Stated another way, the associated facets of the particular item may be updated to include the possible facet keyword descriptor as an associated facet for the particular item.

Figure 6:
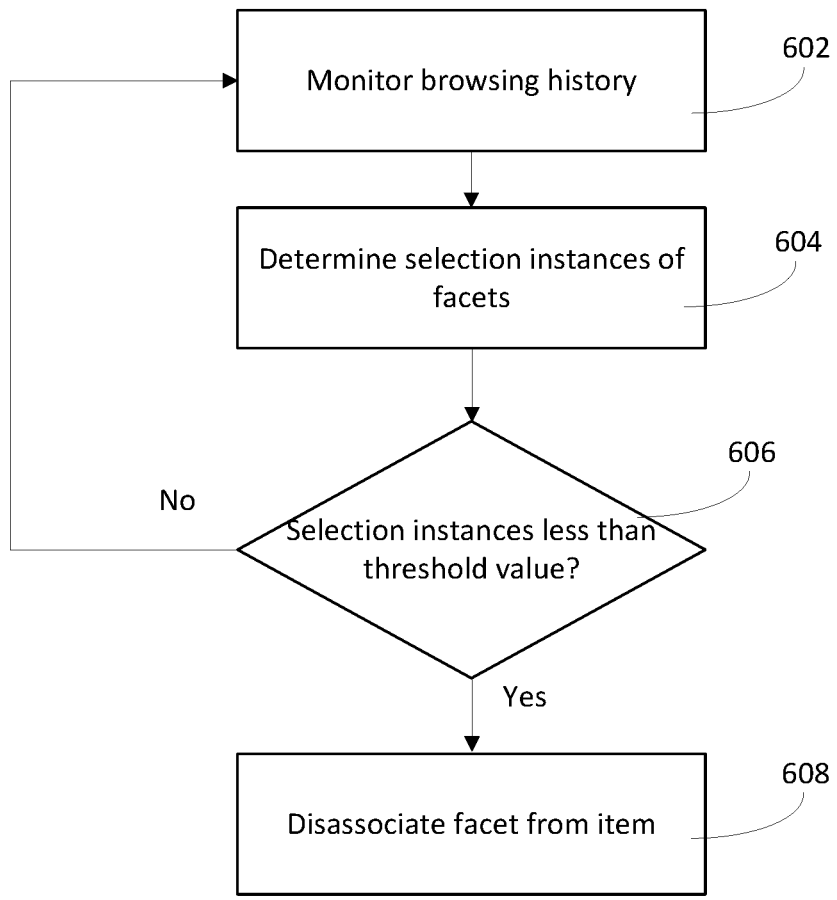
FIG. 6 is a block diagram that illustrates a selected facet disassociation process, in accordance with some embodiments.

FIG. 6 is a block diagram that illustrates a selected facet disassociation process 600, in accordance with some embodiments. The process 600 may be performed at a facet discovery platform in communication with a supplier device, internal merchant device, and customer device, as introduced above. The facet discovery platform may include a datastore and an facet discovery server implemented as at least one server. In certain embodiments, the facet discovery platform may be implemented as a single server or within a single housing. It is noted that the process 600 is merely an example, and is not intended to limit the present disclosure. Accordingly, it is understood that additional operations may be provided before, during, and after the process 600 of FIG. 6, certain operations may be omitted, certain operations may be performed concurrently with other operations, and that some other operations may only be briefly described herein.

At block 602, browsing history from customer devices may be monitored This browsing history may be monitored by, for example, recording browsing history data concerning how the different customer devices are interacting with the facet discovery platform, such as the use (e.g., selections or click throughs) of certain facets.

At block 604, selection instances of various facets may be recorded. These selection instances may reflect instances in which a particular facet associated with a particular item is used (e.g., selected or clicked through). As noted above, these facets may be selected in the course of browsing for a desired item.

At block 606, a decision may be made as to whether the selection instances of a facet is less than a threshold value. This threshold value may be provided by an internal merchant device as a disassociation threshold value in association instructions. In certain embodiments, this disassociation threshold value may be a numerical value. In other embodiments, this disassociation threshold value may be a numerical value within a time period. If the selection instances are below (e.g., pass, or fall below) the threshold value, the process 600 may proceed to block 608. If the selection instances are not below (e.g., do not pass, or do not fall below) the threshold value, the process may proceed back to block 504.

At block 608, a facet for which selection instances are below (e.g., pass) the threshold value may be disassociated from the item that the facet was previously associated with. This disassociation may include removing (e.g., deleting) the facet from a set of associated facets for the item.

Figure 7:
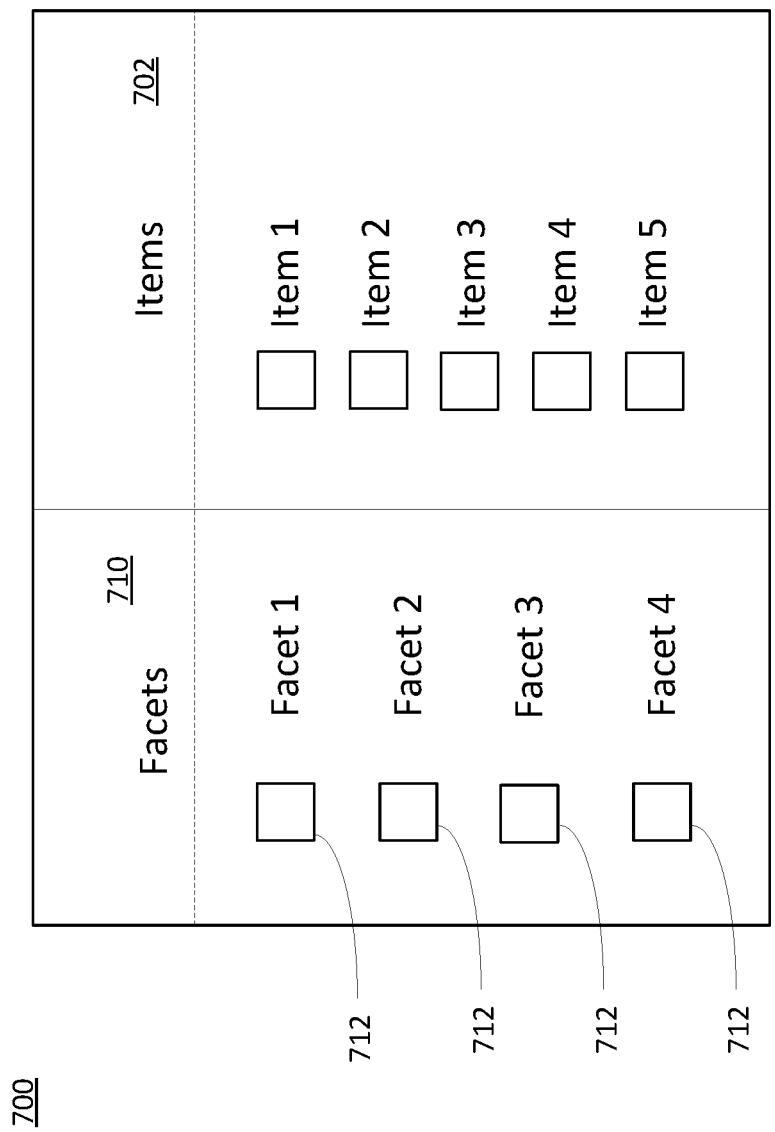
FIG. 7 is a conceptual illustration of a user interface that lists out items along with associated facets, in accordance with some embodiments.

FIG. 7 is a conceptual illustration of a user interface 700 that lists out items along with associated facets, in accordance with some embodiments. The user interface 700 may include a first region 702 that lists out various items (e.g., items 1-5). The items listed may be, for example, results from an item request. In certain embodiments, the various items may be listed out along with additional item data from the respective item datasets of the various items. The user interface 700 may also include a region 710 that lists out all facets (e.g., facets 1-4) associated with all of the various listed items in the first region 702. Each of these facets may be selectable (e.g., via selection or click through of a respective box 712) to further filter the listed items in the first region for items that are associated with the selected facet.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A system, comprising:
  at least one processor operatively coupled with a datastore, the at least one processor configured to:
    receive, from a supplier device, a first item dataset of a plurality of item datasets, wherein the first item dataset characterizes a first item purchasable on a sales platform;
    store the first item dataset in the datastore;
    associate the first item with a first facet of a plurality of facets stored in the datastore, wherein the association is in accordance with an instruction from an internal merchant device, wherein the first facet is separate from the first item dataset, wherein the first facet may be selected to differentiate the first item from a second item purchasable on the sales platform, and wherein the instruction defines the first facet based on the first item dataset;

receive an item request from a customer device;

determine at least a portion of the plurality of facets based on the item request, wherein the portion comprises the first facet;

transmit the at least portion of the plurality of facets to the customer device;

receive a selection of the first facet from the computing device;

retrieve, from the datastore, the first facet;

filter the plurality item datasets based on receiving the first facet;

determine the first item dataset based on the filtering;

retrieve, from the datastore, the first item dataset; and transmit the first item dataset to the customer device for display.

2. The system of claim 1, wherein the at least one processor is further configured to:

determine instances of a keyword descriptor from historical search queries;

associate the keyword descriptor with the first item as a second facet in response to a number of the instances exceeding a threshold value.

3. The system of claim 2, wherein the at least one processor is further configured to:

associate the keyword descriptor with the first item as the second facet in response to the number of the instances exceeding the threshold value within a unit of time.

4. The system of claim 2, wherein the threshold value is provided by the internal merchant device.

5. The system of claim 2, wherein the at least one processor is further configured to retrieve the historical search queries from the datastore.

6. The system of claim 1, wherein the at least one processor is further configured to:

determine selection instances, from the customer device, of a selected facet, wherein the selected facet is part of a facet set associated with the first item, and wherein the facet is part of the facet set;

remove the selected facet from the facet set in response to a number of the selection instances falling below a threshold value.

7. The system of claim 6, wherein the number of the selection instances are based on historical transaction data stored in the datastore.

8. The system of claim 1, wherein the instruction includes the facet.

9. The system of claim 1, wherein the at least one processor is further configured to:

determine a number of selection instances of the facet for the first item;

determine that the number of selection instances of the facet for the first item does not meet a disassociation threshold value; and dissociate the facet from the first item.

10. A method by at least one processing device, comprising:

receiving, from a supplier device, a first item dataset of a plurality of item datasets, wherein the first item dataset characterizes a first item purchasable on a sales platform;

storing the first item dataset in the datastore;

associate the first item with a first facet of a plurality of facets stored in the datastore, wherein the association is in accordance with an instruction from an internal merchant device, wherein the first facet is separate from the first item dataset, wherein the first facet may be selected to differentiate the first item from a second item purchasable on the sales platform, and wherein the instruction defines the first facet based on the first item dataset;

receiving an item request from a customer device;

determining at least a portion of the plurality of facets based on the item request, wherein the portion comprises the first facet;

transmitting the at least portion of the plurality of facets to the customer device;

receiving a selection of the first facet from the computing device;

retrieving the first facet from the datastore;

filtering the plurality of item datasets based on receiving the first facet;

determining the first item dataset based on the filtering;

retrieving the first item dataset from the datastore; and transmitting the first item dataset to the customer device for display.

11. The method of claim 10, further comprising:

removing or adding another facet to a facet set associated with the first item while maintaining the first item dataset, wherein the facet is part of the facet set.

12. The method of claim 10, further comprising:

presenting a facet group in response to the item request from the customer device, wherein the facet group comprises the facet along with additional facets associated with other items different than the first item.

13. The method of claim 10, further comprising:

updating the first item dataset characterizing the first item while maintaining the facet.

14. The method of claim 10, further comprising:

receiving a purchase order for the first item from the customer device in response to the retrieving the first item dataset.

15. A non-transitory computer readable medium having instructions stored thereon, wherein the instructions, when executed by a processor, cause a device to perform operations comprising:

receiving, from a supplier device, a first item dataset of a plurality of item datasets, wherein the first item dataset characterizes a first item purchasable on a sales platform;

storing the first item dataset in the datastore;

associate the first item with a first facet of a plurality of facets stored in the datastore, wherein the association is in accordance with an instruction from an internal merchant device, wherein the first facet is separate from the first item dataset, wherein the first facet may be selected to differentiate the first item from a second item purchasable on the sales platform, and wherein the instruction defines the first facet based on the first item dataset;

receiving an item request from a customer device;

determining at least a portion of the plurality of facets based on the item request, wherein the portion comprises the first facet;

transmitting the at least portion of the plurality of facets to the customer device;

receiving a selection of the first facet from the computing device;

retrieving the first facet from the datastore;
filtering the plurality of item datasets based on receiving the first facet;
determining the first item dataset based on the filtering;
retrieving the first item dataset from the datastore; and
transmitting the first item dataset to the customer device for display.

16. The non-transitory computer readable medium of claim 15, wherein the facet is associated with multiple items.

17. The non-transitory computer readable medium of claim 15, wherein the first item dataset is an identifier for a product or a service.

18. The non-transitory computer readable medium of claim 15, wherein the facet comprises one of: an item brand, an item price, and an item size.

19. The non-transitory computer readable medium of claim 15, wherein the processor is connected with the supplier device, internal merchant device, and the customer device over a network.

20. The non-transitory computer readable medium of claim 15, wherein the facet is part of an facet set associated with the first item.

* * * * *